United States Patent

Zhang et al.

[11] Patent Number: 5,354,576
[45] Date of Patent: Oct. 11, 1994

[54] HYDROGEN STORAGE ALLOY ELECTRODE

[75] Inventors: Yunshi Zhang; Deying Song; Youxiao Chen; Jun Chen; Genshi Wang; Huatang Yuan; Zuoxiang Zhou; Xeujun Cao; Taoshi Zang; Daxin Zhang, all of P.R. China, China

[73] Assignee: Nan Kai University, Tainjin, China

[21] Appl. No.: 995,844

[22] Filed: Dec. 23, 1992

[30] Foreign Application Priority Data

Dec. 28, 1991 [CN] China ............... 91111747.4

[51] Int. Cl.$^5$ ............................................. H01M 4/24
[52] U.S. Cl. ................................. 429/59; 429/101; 429/218; 420/455; 420/900
[58] Field of Search ............... 429/59, 101, 218; 420/455, 900

[56] References Cited

U.S. PATENT DOCUMENTS

| | | | |
|---|---|---|---|
| 4,605,603 | 8/1986 | Kanda et al. | 429/59 |
| 5,006,328 | 4/1991 | Hong | 423/644 |
| 5,008,164 | 4/1991 | Furukawa et al. | 429/59 |
| 5,053,292 | 10/1991 | Haselse et al. | 429/101 |

FOREIGN PATENT DOCUMENTS

| | | |
|---|---|---|
| 0251385 | 1/1988 | European Pat. Off. . |
| 0417697 | 3/1991 | European Pat. Off. . |

*Primary Examiner*—Prince Willis, Jr.
*Assistant Examiner*—M. Nuzzolillo

[57] ABSTRACT

This invention relates to an electrode composed of an active material. This electrode comprises a composition of a hydrogen storage alloy powder possessed of relatively high electrochemical capacity with a formula of $MmNi_{5-x-y-z}A_xB_yC_z$ and a hydrogen storage alloy powder possessed of catalytic activity with a formula of $D_{2-u}E_{1-v}F_uG_v$ wherein Mm is the mischmetal, A=Co, Cr, V; B=Mn, Sn, Be; C=Al, Ca, Mg, Zr, Nb; D=Mg, Al; E=Cu, Zn; F=Ca, Be; G=Sn, Bi; $0 \leq x \leq 0.5$, $0 \leq y \leq 1.5$, $0 \leq z \leq 0.5$, $0 \leq u \leq 1$, $0 \leq v \leq 0.5$. The internal pressure of the alkali battery assembled with this electrode can be effectively lowered, the capacity and the cycle life of the sealed battery are improved, the activation period of the battery is shortened to 3-5 times, thus the crucial technical problem about industrial mass production of this kind of alkali batteries is surmounted.

12 Claims, No Drawings

HYDROGEN STORAGE ALLOY ELECTRODE

BACKGROUND OF THE INVENTION

This invention relates to a hydrogen storage alloy electrode, particularly to an active material of the hydrogen storage alloy electrode.

The reason why a hydrogen storage intermetallic compound can be used as electrode is that when it is charged and discharged in the water solution, the reversible reaction occurs according to the following equation $$M + xH_2O + xe^- \underset{discharge}{\overset{charge}{\rightleftarrows}} MH_x + xOH^-$$

As Matsumoto disclosed in "New Type Hydrogen Storage Alloy Batteries, External Rare Earth Information" (1990.3), the hydrogen storage intermetallic compounds developed so far are mainly the alloys of MmNi5 system and TiNi system. According to the literature reports which have been searched, the research relating to utilizing them as the hydrogen storage alloy electrodes is still limited to how to improve its electrochemical capacity or electrochemical stability by selecting the composition of these hydrogen storage alloys, but up to now there has been no report about industrial mass production and practical application of the sealed alkali battery assembled from the previous hdrogen storage alloy electrode. The reason is because the activation of the hydrogen storage alkali battery is designed on the basis of the reaction.

$$2H_2O(l) + \text{electric current} = 2H_2(g) + O_2(g)$$

When the battery is in charging, active hydrogen is produced on the hydrogon storage alloy anode and is absorbed in situ. Active oxygen is produced on the nickel oxide cathode and is combined with the nickel oxide to form Ni(III) hydrous oxide. When the battery is discharging, the hydrogen is released from the hydrogen storage alloy anode and is combined with the oxygen released from Ni(III) cathode to form the water; in the meantime, the electric current is produced. The above mentioned reversible process can be expressed as follows:

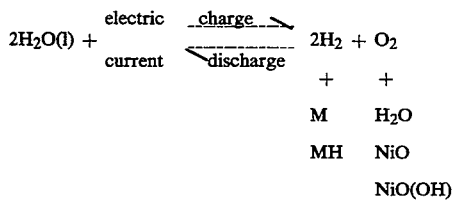

It can be seen from above equation that, in the activation charge-discharge process of the hydrogen storage battery, because of the increasing of $H_2$ and $O_2$, the internal pressure of the battery will be raised inevitably, especially in the later period of charging; the internal pressure is raised obviously, which causes the capacity of the sealed hydrogen storage alkali battery to be 10% lower than the capacity of the open one. In addition, owing to the increase of the oxygen produced from the cathode, the cycle life of the battery is severely impacted. The battery can be sealed up in commerical production only as the internal pressure is lowered.

Therefore, the question of how to lower the internal pressure of the hydrogen storage alkali battery has already become the crucial technical problem to be solved before the sealed hydrogen storage alkali battery can be put into industrial production and practical application. JP60-130053 (1985) introduced the method of embedding a current collector into the battery to reduce the internal pressure. Although a certain effect is reached, in the case of certain batteries such as AA type internal space is strictly limited, so this method is impractical. JP61-216269 (1986) introduced a method of increasing the gas passages by drilling some holes in a separator between anode and cathode, but the effect of descending internal pressure is not ideal. JP62-295358 (1987) reported the technique of applying a layer of carbon on the hydrogen storage alloy material and conducting a vacuum heat treatment at a temperature as high as 1050° C., then pulverizing the material and carrying on electrode preparation, but the enforcement of this technical process is difficult and not easy applied in large scale production. Moreover, the decompression is effect only in ⅓ Co.1 small current charging. JP63-55058 (1988) introduced a method of decompression by embedding crystalline fiber. The preparation of the crystalline fiber is not only time consuming but also expensive, so it is not suitable for industrial enforcement. JP63-314777 (1988) and Fan, D., in J.Electrochem. Soc, 138, 1 (1991) proposed the scheme of improving the structure design and the charge institution of the battery. However, the altered structure design is difficult to fit in with industrial production, and the improved charge institution limits the application scope of the battery. So all of these methods are not practical methods.

The objective of this invention is to solve the crucial technical problem, of industrial mass production and practical application of the sealed hydrogen storage alloy alkali battery effectively and conveniently, by proceeding from the composition of the hydrogen storage alloy material, improving the characters of the hydrogen storage alloy material in essence, causing it to take effect of catalysis in charge-discharge process, accelerating the combination process of the accumulated inactive $H_2$ and $O_2$ produced in the later period of activation to react to form $H_2O$ to reduce the internal pressure of the battery.

Another object of the present invention is to provide a hydrogen storage alloy electrode which can accelerate the combination process of $H_2$ and $O_2$ into $H_2O$ inside a sealed battery to greatly reduce the internal pressure of the sealed battery.

SUMMARY OF THE INVENTION

According to the present invention, a hydrogen storage alloy electrode has an active material which comprises a first hydrogen storage alloy $M_1$ and second hydrogen storage alloy $M_2$. The two alloys $M_1$ and $M_2$ are coated with a Ni, P based metallic compound before the $M_1$ and $M_2$ are mixed together. $M_1$ has a composition of $MmNi_{5-x-y-z}A_xB_yC_z$, wherein Mm is a Mischmetal, A=Co, Cr, V; B=Mn, Sn, Be; C=Al, Ca, Mg, Zr, Nb; $0 \leq x \leq 0.5$, $0 \leq y \leq 1.5$, $0 \leq z \leq 0.5$. $M_2$ is $D_{2-u}E_{1-u}F_uG_v$ wherein D=Mg, Al; E=Cu, Zn; F=Ca, Be; G=Sn, Bi; $0 \leq u \leq 1$, $0 \leq v \leq 0.5$.

DETAILED DESCRIPTION OF THE INVENTION

According to the present invention, a hydrogen storage alloy electrode has an active material which comprises a first hydrogen storage alloy $M_1$ and a second hydrogen storage alloy $M_2$. $M_1$ is $MmNi_{5-x-y-z}A_xB_yC_z$, wherein Mm is a Mischmetal, A=Co, Cr, V; B=Mn, Sn, Be; C=Al, Ca, Mg, Zr, Nb; $0 \leq x \leq 0.5$, $0 \leq y \leq 1.5$, $0 \leq z \leq 0.5$. $M_2$ is $D_{2-u}E_{1-u}F_uG_v$ wherein D=Mg, Al; E=Cu, Zn; F=Ca, Be; G=Sn, Bi; $0 \leq u \leq 1$, $0 \leq v \leq 0.5$.

In accordance with the invention, the two alloys $M_1$ and $M_2$ are mixed together after $M_1$ and $M_2$ are coated with a Ni, P, based metallic compound. The weight ratio of $M_1$ and $M_2$ is from about 20:1 to 10:1.

The Ni, P based metallic compound according to the invention is a Ni, P, J metallic compound in which J is an element selected from Cr, W, Co or Sn. The atomic percentage of the metallic compound is for Ni:90 to 97%, for P:1 to 7% and for J:0 to 5%, based on total atom of the metallic compound. Preferably the metallic compound is a Ni, P metallic compound in which the atomic percentage of Ni is from 93 to 97%, P is from 3 to 7%.

It is preferred according to the invention that A is Cr, B is Be, C is Nb, $0 \leq x \leq 0.5$, $0 \leq y \leq 1.5$, $0 \leq z \leq 0.5$, more preferably x is 0.4, y is 1.2, z is 0.4; or A is Co, B is Sn, C is Ca, $0 \leq x \leq 0.5$, $0 \leq y \leq 1.5$, $0 \leq z \leq 0.5$, more preferably x is 0.4, y is 1.2, z is 0.4; or A is Cr, B is Mn, $0 \leq x \leq 0.5$, $0 \leq y \leq 1.5$, $Z=0$; or A is V, B is Sn, C is Zr, $0 \leq x \leq 0.5$, $0 \leq y \leq 1.5$, $0 \leq z \leq 0.5$.

It is also preferred according to the invention that D is Mg, E is Cu, F is Ca, G is Sn, $0 \leq u \leq 1$, $0 \leq v \leq 0.5$, more preferably, u is 0.5, v is 0.4.

In accordance with the invention, the alloy $M_1$ M1 and the alloy $M_2$ M2 are pulverized to form alloy powders before the two alloys are coated with the Ni, P based metallic compound. The average size of the two alloy powders is from about 250 to 600 mesh, preferably about 300 to 400 mesh. By a method of chemical plating, the coating of the Ni, P based metallic compound is formed on the surface of the two alloy powders. $M_1$ and $M_2$ are seperately coated with a Ni, P based metallic compound. The plating solution for $M_1$ can be different from the one used for $M_2$ It is preferred that the same plating solution is used for $M_1$.

What is claimed is:

1. A hydrogen storage alloy electrode having an active material which comprises:
   a first hydrogen storage alloy $M_1$ with a composition of $$MmNi_{5-x-y-z}A_xB_yC_z$$

wherein Mm is a mischmetal, A=Co, Cr, V; B=Mn, Sn, Be; C=Al, Ca, Mg, Zr, Nb; $0 \leq x \leq 0.5$, $0 \leq y \leq 1.5$, $0 \leq z \leq 0.5$ and a second hydrogen storage alloy $M_2$ with a composition of $$D_{2-u}E_{1-v}F_uG_v$$

wherein D=Mg, Al; E=Cu, Zn; F=Ca, Be; G=Sn, Bi; $0 \leq u \leq 1$, $0 \leq v \leq 0.5$; and both the alloy $M_1$ and the alloy $M_2$ being coated with a Ni, P based metallic compound before the two alloys are mixed.

2. The electrode according to claim 1, wherein the weight ratio of $M_1$ and $M_2$ is 20:1~10:1.

3. The electrode according to claim 1, wherein the metallic compound is a Ni, P, J metallic compound in which J is an element selected from the group consisting of Cr, W, Co and Sn.

4. The electroade according to claim 3, wherein the atomic percentage of the Ni, P, J metallic compound is for Ni: 90 to 97%, for P: 1 to 7% and for J: 0 to 5%.

5. The electrode according to claim 1, wherein the metallic compound is a Ni, P metallic compound in which the atomic percentage of Ni is from 93 to 97% of the metallic compound, P is from 3 to 7%.

6. The electrode according to claim 1, wherein A=Cr, B=Be, C=Nb.

7. The electrode according to claim 6, wherein x=0.4, y=1.2, z=0.4.

8. The electrode according to claim 1, wherein A=Co, B=Sn, C=Ca.

9. The electrode according to claim 8, wherein X=0.4, y=1.2, z=0.4.

10. The electrode according to claim 1, wherein D=Mg, E=Cu, F=Ca, G=Sn.

11. The electrode according to claim 10, wherein u=0.5, v=0.4.

12. The electrode according to claim 1, wherein the thickness of coating is from 1 to 10µ.

* * * * *